United States Patent
Quayle et al.

[15] 3,695,230
[45] Oct. 3, 1972

[54] APPARATUS FOR THE DETECTION OF MASTITIS IN MILK ANIMALS

[72] Inventors: Joshua Creer Quayle, 14 Raby Road, Stockton, Teesside; Graham Roland Greatrix, 12 Gillpark Grove, Seaton Carew, both of England

[22] Filed: June 29, 1970

[21] Appl. No.: 50,711

[30] Foreign Application Priority Data

June 30, 1969 Great Britain..........33,032/69

[52] U.S. Cl. ...............119/14.14, 119/14.15, 324/30
[51] Int. Cl. ...............................................A01j 7/00
[58] Field of Search ..........119/14.15, 14.14; 324/30; 136/83, 111

[56] References Cited

UNITED STATES PATENTS

| | | | |
|---|---|---|---|
| 2,837,271 | 6/1958 | Haglund | 324/30 X |
| 2,898,549 | 8/1959 | Miller | 119/14.15 X |
| 3,374,672 | 3/1968 | Horne | 324/30 B |
| 3,474,330 | 10/1969 | Dauphinee | 324/30 |
| 3,512,080 | 5/1970 | Hanson | 324/30 |
| 2,843,649 | 7/1958 | Louis | 136/111 |
| 2,825,748 | 3/1958 | Coler | 136/83 |

FOREIGN PATENTS OR APPLICATIONS

| | | | |
|---|---|---|---|
| 610,545 | 10/1948 | Great Britain | 324/30 |
| 650,199 | 2/1951 | Great Britain | 119/14.15 |
| 1,002,416 | 8/1965 | Great Britain | 324/30 B |

OTHER PUBLICATIONS

Dairy Industries – " Rapid Abnormality Indicator" – Jan. 1947 pages 35– 40 & 48, by J. G. Davis G. R. Greatrix, J. C. Quayle and R. A. Combe – " Detection of Abnormal Milk by Electric Rical Means" – J. Dairy Report 1968– (35– 213)– Pages 213– 221

*Primary Examiner*—Aldrich F. Medbery
*Attorney*—Cushman, Darby & Cushman

[57] ABSTRACT

Apparatus for comparing the conductivities of liquid streams is described. Such apparatus has a particular application in detecting mastitis in milk animals where differences in the conductivities of milk streams from different teats of the same animal may indicate the presence of mastitis. The apparatus described is specially suited for use with milking machinery in that it is economical to manufacture and is easy to keep clean. In one form the apparatus has four U shaped channels one for each stream of milk from a cow. The channels include electrodes so connected that each milk stream can form one arm of a four arm resistance bridge. In other embodiments four coils or four groups of electrodes are provided, one for each of four conductivity measuring cells in a cylindrical chamber on the claw piece of milking apparatus. A switch for use with the apparatus is described to allow a resistor to be substituted in the bridge for the resistance of any milk stream.

8 Claims, 12 Drawing Figures

PATENTED OCT 3 1972

3,695,230

INVENTORS
Joshua Crew Quale
Graham Orland Greats

By Cushman, Darby & Cushman
ATTORNEYS

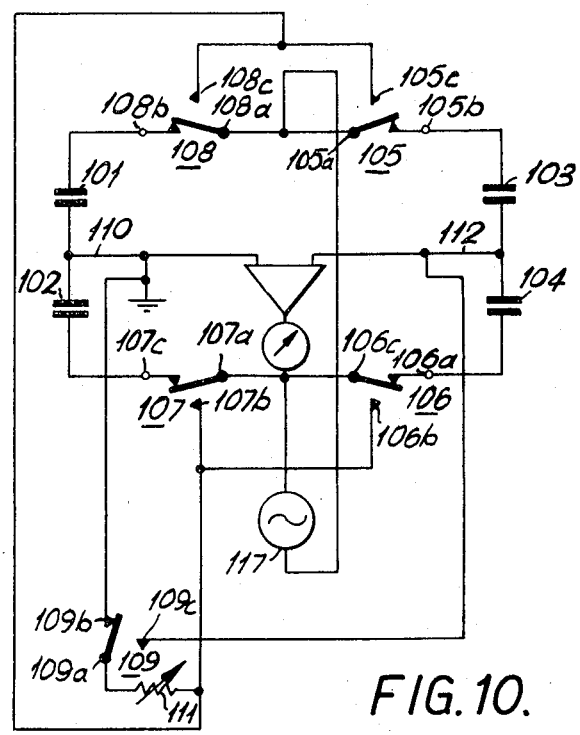
FIG. 10.
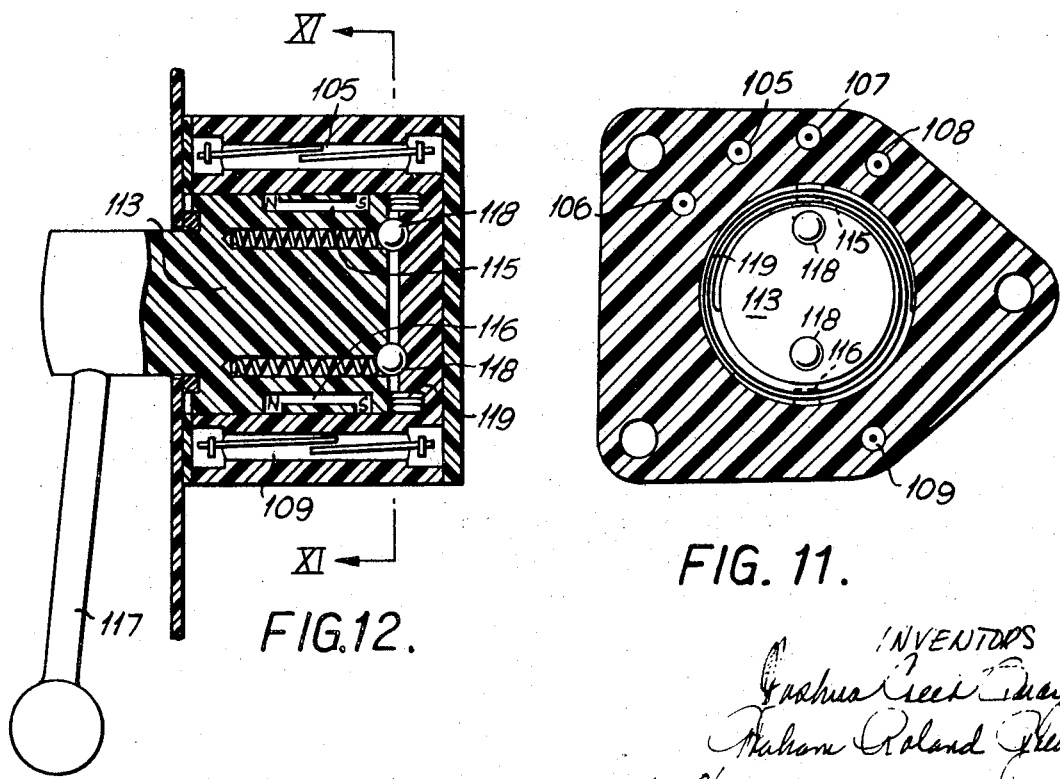
FIG. 11.
FIG. 12.

APPARATUS FOR THE DETECTION OF MASTITIS IN MILK ANIMALS

The present invention relates to the comparison of the resistivities of liquids, and particularly the detection by such comparison of mastitis in cows at a stage early enough to prevent the infection of other cows, lasting damage to the udder, and reduction in milk yield.

It has previously been proposed in Patent Application No. 41938/68 to detect mastitis using apparatus which during milking compares the resistance of milk from different quarters of a cow's udder, using an electrical bridge. If the milk stream from one quarter has a different conductivity from other streams, mastitis may be present.

Comparing resistance presents several problems. For example, inaccurate results will be obtained if ineffective cleansing leaves coatings of fat or milk stone on the electrodes of conductivity cells forming part of the comparison apparatus. Uniting the electrodes to the surrounding moulding without leaving crevices in which bacteria and solid deposits can lodge is difficult and tends to make conductivity cells with electrodes which contact the milk fairly expensive.

A further problem arises in measurements where conductivity of a liquid is being measured while the liquid flows continually through part of the apparatus. It is known to overcome this problem by preparing electrodes as part of a cylindrical hollow chamber through which the fluid flows, the electrodes being annuli. To avoid crevices the insulating material is moulded around the electrodes which are assembled beforehand on a cylindrical mandrel. This method of construction gives rise to difficulties in manufacture, notably the movement of the electrodes during moulding and the failure of the moulding to fill the spaces around the electrodes.

Further difficulties arise in that the moulding material contracts on to the mandrel making the mandrel difficult to extract. It is also difficult to inspect a cylindrical cell when it is completed.

According to a third aspect of the present invention there is provided apparatus for use in comparing the conductivities of milk drawn during milking from the quarters of the udder of a cow, including a chamber divided into four conductivity cells, and having eight electrodes, two in each cell separated by insulating material, the electrodes and insulating material in each cell forming a curved surface in that cell which in the cross-section of greatest curvature forms a generally circular arc, the radius of which is longer than the arc, the chamber having four inlets, one in each cell, and a common outlet with access from all the cells, and the four inlets being positioned generally away from the common outlet to cause milk to flow over the electrodes in each cell before reaching the common outlet.

While the difficulties associated with manufacturing cylindrical conductivity cells can be overcome, the apparatus according to the third aspect of the invention is much easier to construct since planar or near planar electrode assemblies are easier to construct. The moulds are easier and cheaper to make and since direct pressure can be applied to the electrodes during manufacture there is little difficulty in providing adequate compression of the insulating moulding material when it is being moulded around the electrodes. Four pairs of electrodes may be provided, each electrode being a sector of an annulus. The electrodes of each pair are separated by one of the portions of insulating material, and the annulus forms the bottom of a vertical cylindrical chamber divided by a central boss and radial barriers into four cells each containing a pair of electrodes. Adjacent electrodes on either side of the cell barriers may be formed integrally out of sheet material, and may form the corners of any electrical bridge.

A generally annular arrangement of electrodes may also be in a claw piece in which the conductivity of four milk streams can be compared using a bridge. The electrodes and the portions of insulating material form part of the plane surface of a generally hemispherical chamber divided by radial barriers into four cells. Milk inlets opposite the electrodes in each cell and a common outlet are provided.

Precious metals are too expensive for use as the material for the electrodes, in the commercial production of conductivity cells for apparatus according to the third aspect of the invention.

Precious metals are also soft and have little abrasion resistance. Although alloys can be produced which have good mechanical qualities, these alloys are also expensive.

Base metals form surface films which affect the measured conductivity by inserting extraneous resistances and voltages into the measurement circuit. In addition, polarization effects are causes of errors in measurement.

It is known to use carbon, especially the graphitic form and mixtures with a graphite content. These electrode materials present some difficulty with adhesion between the electrode and the surrounding insulating mount. Moreover, they are soft and subject to abrasion during cleansing.

To overcome the above mentioned disadvantages of electrode materials, the electrodes may be made of a conducting rubber which is compatible with other rubbers. Such rubbers are used as conducting tires on trolley buses and for conducting gloves, boots and clothing to avoid electric shock. They are made by compounding natural or synthetic rubber with reinforcing black (i.e., carbon black) and/or sufficient colloidal graphite to raise the conductivity to the required level. Conducting rubbers can be made with such synthetic rubbers as Neoprene, which are resistant to swelling in the presence of animal fat.

Another material which can be used for making the electrodes is a conducting resin consisting, for example, of a formaldehyde-condensation resin formed in the presence of carbon black and/or finely divided graphite. Such a resin is compatible with phenolic and other formaldehyde condensation resins. If the resin is to be conducting, the right quality and content of carbon black and/or graphite is required and the resin must be produced under the correct conditions.

A conducting epoxy resin moulding material can be manufactured by mixing metal flake, preferably silver flake, with a sufficient quantity of epoxy resin and a second mixture of silver flake with the appropriate catalyst or hardener. When the resin and hardener are mixed in the correct proportion the resultant moulding is conductive and abrasion-resistant, and is also compatible with other epoxy resins including laminates. Such a resin is capable of giving adequate conductivity for the electrodes.

A convenient way of carrying out the comparison between the resistivities of streams of milk is to use an electrical bridge.

The bridge may include switch means allowing a resistor to be substituted successively in each of the four arms of the bridge.

The switch means conveniently includes five groups of changeover contacts in each of which a common contact is normally in contact with a first contact but when changed over is in contact with a second contact. The common contacts of two of the groups are connected to one corner of the bridge, and the common contacts of two further groups are connected to the opposite corner of the bridge. Each bridge arm includes the first and common contacts of one of the said groups particular thereto, the second contacts of the four groups being connected to one end of the resistor, the first and second contacts of the fifth group being connected to the other opposite corners, respectively, of the bridge, and the other end of the resistor connected to the common contact of the fifth group.

The groups of contacts may be reed switches arranged around the periphery of a rotor carrying magnets to operate the switches. The magnets may be so arranged that as the rotor is rotated a first magnet successively changes over the contacts of the first four groups, and a second magnet changes over the contacts of the fifth group when the contacts of the third and fourth groups are changed over.

Certain embodiments of the invention will now be described, by way of example, with reference to the accompanying drawings, in which:

FIG. 10 shows a bridge circuit in which a resistor can be substituted for any conductivity cell;

FIG. 11 is a cross-section of switch means used in the circuit of FIG. 10; and

FIG. 12 is a diametral cross-section of the switch means of FIG. 11.

Figure 1:
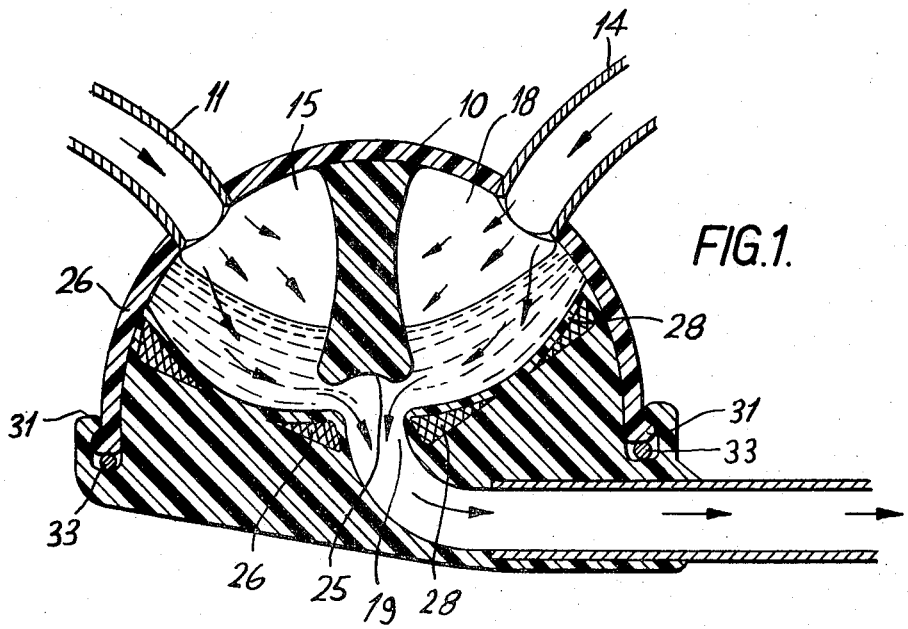
FIG. 1 is a vertical cross-section of a claw piece used in an embodiment of the second aspect of the invention.
Figure 2:
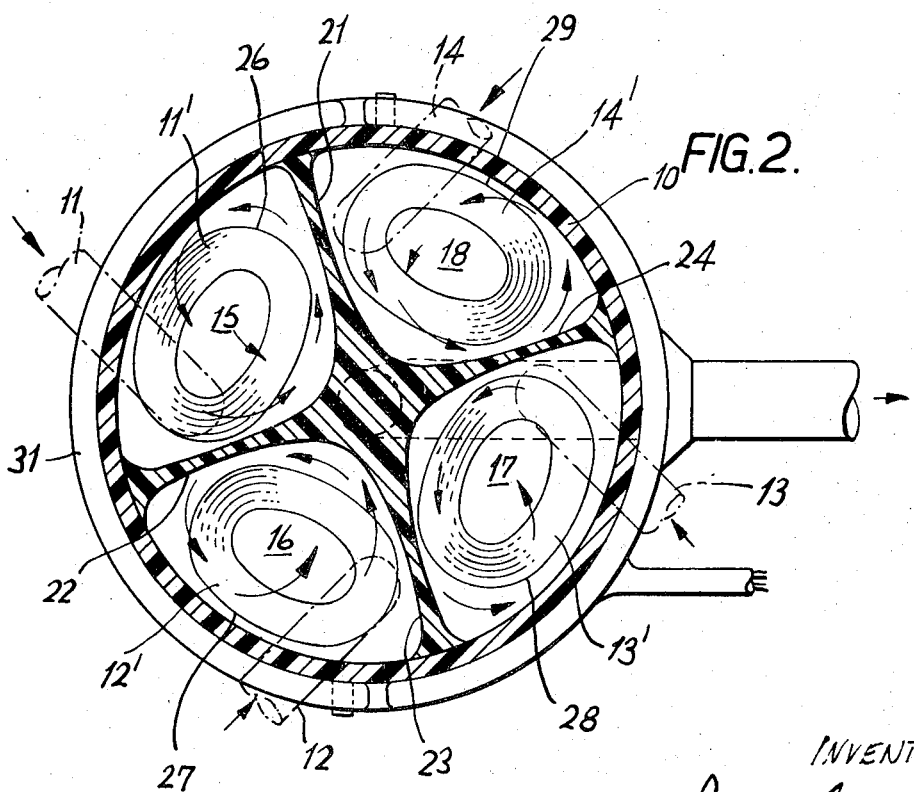
FIG. 2 is a horizontal cross-section of the claw piece of FIG. 1.

In FIGS. 1 and 2 a claw piece 10 is shown which can be incorporated in milking apparatus for cows, with the object of detecting mastitis. The claw piece 10 is of generally hemispherical shape with four inlet pipes, 11, 12, 13 and 14. These pipes terminate at one end in teat cups (not shown) and at the other end in four chambers, 15 to 18, of the claw piece. At the center of the bottom of the claw piece there is an exit pipe 19 which is connected to a milking machine (not shown). The four cells, 15 to 18, are divided by radial barriers 21 to 24, and the barriers are united at a central boss 25 above the end of exit pipe 19.

Four coils of wire, 26 to 29, are embedded in the bottoms of the chambers 15 to 18, respectively.

A bayonet catch 31 is provided uniting the top of the claw piece 32 with its base 33.

Figure 3:
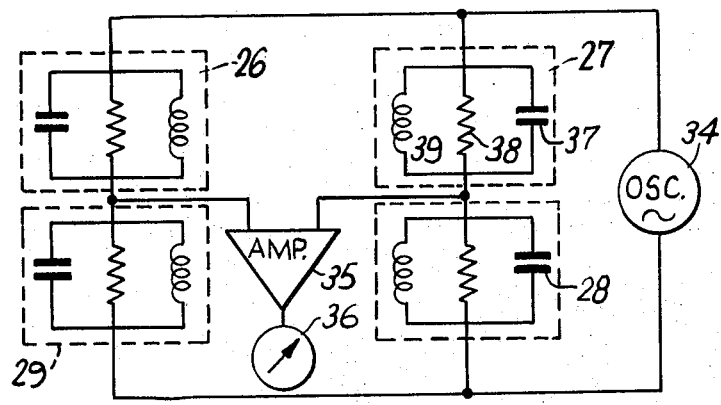
FIG. 3 is a block diagram of the above mentioned embodiment, including equivalent circuits incorporated in part of the claw pieces of FIGS. 1 and 2.

The coils 26 to 29 are connected in the bridge circuit of FIG. 3. The coil 27 is shown as an equivalent inductance 39, an equivalent resistance 38, and an equivalent capacitance 37. The coils 26, 28 and 29 are shown in a similar way. The bridge has four arms comprising the four coils, an oscillator 34 connected to one pair of opposite corners of the bridge, and an amplifier 35 coupled to a null detector 36 connected to the other opposite corners of the bridge.

To minimize capacitive coupling between adjacent coils and its effects on the out-of-balance signal, the windings of the coils are so arranged that the outermost turns are at the ends of the windings connected to the oscillator. Then capacitance between adjacent coils 26, 27 and 28, 29 has no effect since the adjacent turns are at the same potential. Capacitance between the coils 26 and 29, and 27 and 28, are merely shunts across the bridge and do not affect the balance.

To minimize inductive coupling, between adjacent coils, the flow of current is arranged so that all four are magnetized in the same sense.

When milk from a healthy cow enters the claw piece the impedances of the four coils are equal and the bridge is balanced. The milk affects the impedance of the coils in three ways. Firstly, the milk acts as a resistive secondary coil and currents are induced to flow into it. The consequent loss of energy is reflected in a diminution of the effective parallel resistance of the coil; secondly, the effective inductance of the coil is reduced; and thirdly, the self-capacitance of the coil is increased by the presence of the milk.

When a cow becomes infected with mastitis the conductivity of her milk increases. Hence, if one-quarter of a cow's udder is infected the milk flowing in one of the cells of the claw piece 10 will have a different conductivity from the milk flowing in the other cells. The change in conductivity will alter the equivalent series resistance of the coil associated with that cell and also its inductance and capacitance.

Provided the coils are constructed in known ways to make the effects of permittivity small, the changes in the effective inductance are indicative of changes in the resistance of the milk. Thus the resistive component or the inductive component of the impedances of the coils may be compared using suitable known bridges and if necessary additional known circuits. Instead, as in FIG. 3, the impedance of the coils may be compared using a known bridge.

The accuracy of measurement using the bridge is impaired if the milk adjacent to the coils contains bubbles of foam. This effect is minimized by positioning the inlet tubes 11 to 14, shown superimposed on FIG. 2, so that as the milk is drawn into the claw piece it swirls round the cells 15 to 18 in the directions indicated by arrows 11' to 14'. The swirling action throws the foam towards the top of the claw piece so that milk adjacent to the coils is foam-free. The swirl of the milk also helps to spread the milk over the interior surface of the claw piece just above the coils, and therefore minimizes "channelling"; that is the formation of flow patterns which would leave portions of this surface thinly covered with milk.

Figure 4:
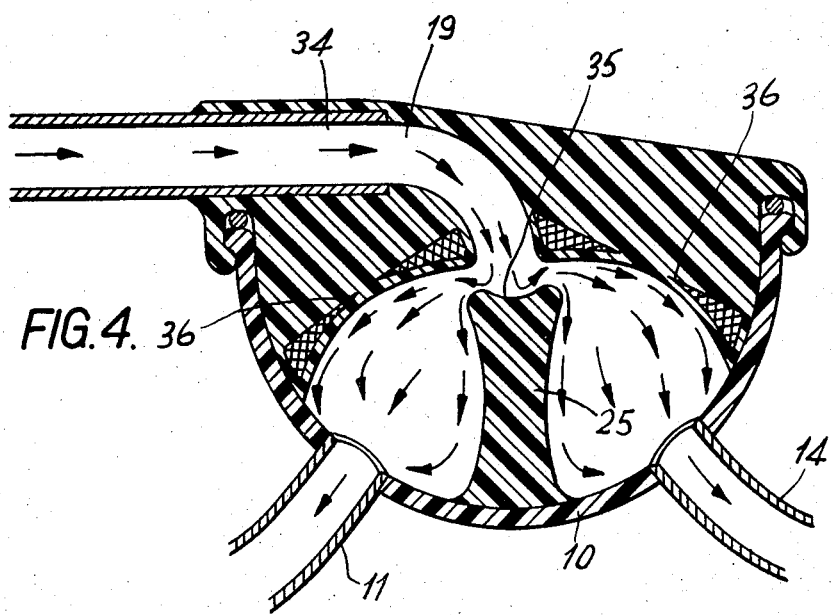
FIG. 4 shows the claw piece of FIG. 1 in the purging position.

The claw piece 10 has been devised so that purging is particularly effective. The claw piece is inverted, as shown in FIG. 4, for purging with the teat cups hanging downwards on their pipes. A detergent germicide such as Sulphamic Acid in hot water is passed through the inlet pipe 19 in the direction of the arrows 34 where it impinges on a concave surface 35 of the central boss 25. The germicidal detergent is thrown in the form of a spray on to the surfaces 36 covering the coils and then passes out of the inlet pipes 11 and 13. This process is followed by the prolonged circulation of hot water following the same path as the detergent.

As has been mentioned, where it is desired to compare the conductivities of milk streams, certain disadvantages arise in the construction of cylindrical conductivity cells. These disadvantages can be largely overcome if conductivity apparatus according to a third aspect of the invention is used. Several embodiments of this apparatus will now be described.

Figure 5:
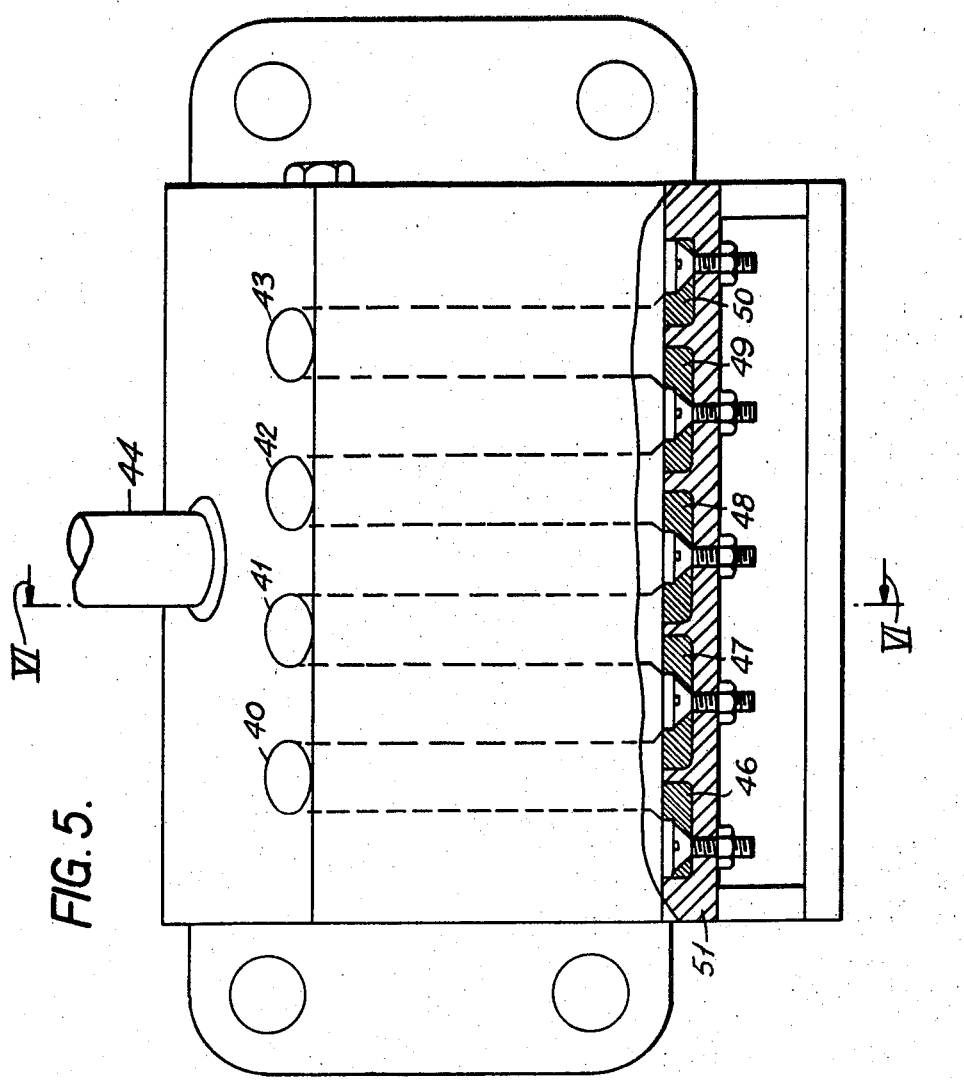
FIG. 5 is a front view, partly cut away, of a first embodiment of the third aspect of the invention.
Figure 6:
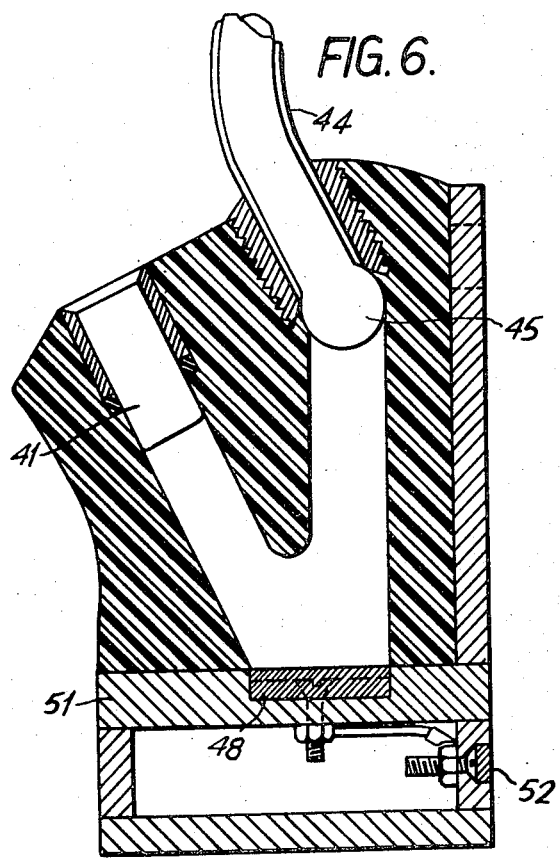
FIG. 6 is a cross-section of the apparatus of FIG. 5.

In FIG. 5 a conductivity apparatus is shown which has its electrodes arranged in a plane. The apparatus has four inlet pipes 40 to 43 which are connected to teat cups, and one outlet pipe 44 which is connected to a milking machine. As can be seen in FIG. 6 the inlet pipe 41 is U-shaped and connects with a common outlet header 45 joined to the outlet pipe 44. The other inlet pipes 40, 42 and 43 are arranged in the same way.

The cell has five electrodes, 46 to 50, recessed in a block 51 of insulating material and held in place by counter-sunk screws. At the bottom of each U a portion of the insulating block 51 separates adjacent electrodes. Thus since milk from each teat is drawn through a different U four resistances bridging the electrodes are formed each having a resistance due to milk from a different teat. Hence if the electrodes 46 to 50 are joined together they can be used with the other electrodes as the corners of a resistance bridge. Any changes of conductance due to infection with mastitis can then be detected by imbalance in the bridge.

The connections to the bridge are made by way of plug contacts such as the plug contact 52 for the electrode 48. The lower portion of the conductivity cell shown in FIGS. 5 and 6 plugs into a holder (not shown) which has spring contacts adapted to make contact with the appropriate plug contact.

The insulating block 51 and its associated electrodes 46 to 50 are simple to construct since they can be made and inspected entirely separately from the rest of the cell and assembled later.

Figure 7:
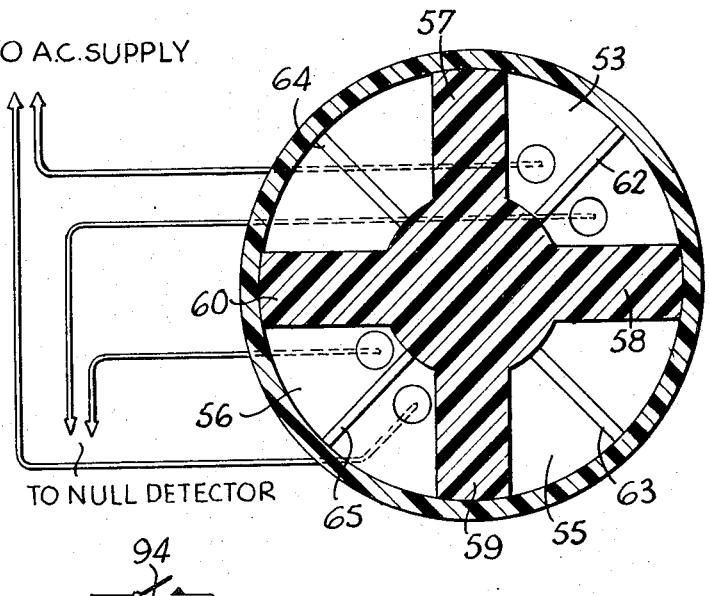
FIG. 7 is a horizontal cross-section of a second embodiment of the third aspect of the invention.

FIG. 7 shows another conductivity apparatus, having four electrodes 53 to 56 which are sectors of an annulus and are arranged in a plane. The apparatus is cylindrical and is divided into four cells by radial walls 57 to 60. The walls divide one electrode into two portions, the portions being in adjacent cells. The electrodes are insulated from one another by radial insulating barriers 62 to 65 so that when milk is pumped through the compartments through an inlet in each cell (not shown) and a common outlet (not shown) the milk bridges adjacent contacts with a resistance dependent on the milk. The inlets are in the cylinder end opposite the electrodes so that provided this end is uppermost and the depth of immersion is appreciably greater than the width of the insulating barriers 62 to 65 the conductivity of the cells will be little affected by frothing since froth rises to the surface of the milk. As before, the electrodes may be used to form the corners of an a.c. bridge in order to detect mastitis in a cow from which the milk is drawn. The common outlet may be below the junction of the barriers as is the outlet in the claw piece of FIG. 1.

Figure 8:
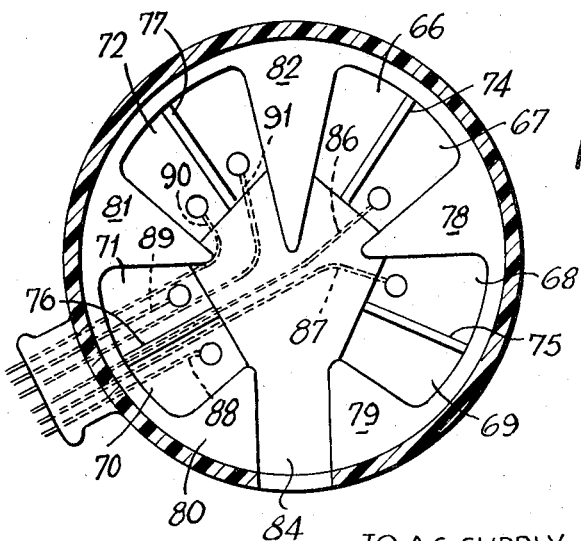
FIG. 8 is a horizontal cross-section of a claw piece incorporating a third embodiment of the third aspect of the invention.
Figure 9:
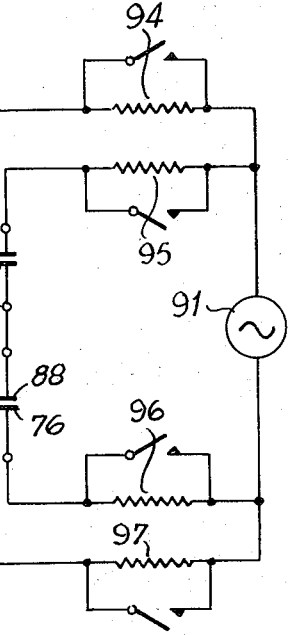
FIG. 9 is a circuit diagram, which includes the third embodiment.

The arrangement of FIG. 7 can be modified for use in a claw piece, which can be incorporated in milking apparatus for cows, as shown in FIG. 8. This modified arrangement has eight electrodes 66 to 73 arranged in pairs with each pair divided by one of insulating barriers 74 to 77. The electrodes 66 to 73 and the barriers 74 to 77 form a planar base for the claw piece which is divided into four conductivity cells by generally radial barriers 78 to 82. Milk is drawn through the claw piece from inlets, above the electrode pairs, in a hemispherical cover for the claw piece. The outlet is by a pipe, not shown, immediately above a portion 84 of the claw piece. Connections 86 to 91 are provided for the electrodes 67, 68, 70, 71, 72 and 73 respectively. The electrodes can then be connected in the bridge circuit of FIG. 9 with an oscillator 91, an amplifier 92, and a null detector 93. Series resistances 94 to 97 are provided which may be inserted in series with cells. Such a claw piece can be modified to allow purging in the same way as described in connection with FIG. 4.

Where the conductivity of milk is being tested, it is often useful to be able to substitute a resistor, equal to the resistance of a conductivity cell when filled with uninfected milk, for a conductivity cell. When one quarter is infected the bridge is unbalanced but there is no indication which is the infected quarter. By substituting a resistor for each cell in turn it becomes clear, when the bridge balances, which quarter is infected.

A visual indication of out-of-balance may be provided by feeding the amplifier output to a lamp which takes the place of the null detector and illuminates when the out-of-balance state exists. The lamp glows more brightly as the out-of-balance condition becomes worse and the mastitic state becomes more acute. The lamp dims and may extinguish when the substitute resistor is connected in place of the cell which carries milk from the infected quarter.

In FIG. 10 a bridge is shown with four conductivity cells, 101 to 104, which may be any of the conductivity cells of FIGS. 5 to 8, for example. The cells are connected in series with reed relays 105 to 108 respectively. Each relay has a common contact and two changeover contacts designated by the relay number followed by the letters $a$, $b$ and $c$, respectively. The contacts $a$ and $b$ of each relay are normally closed, and the contact $c$ is open-circuit. A further reed relay 109 has a similar contact arrangement and is connected between a corner of the bridge 110 and one end of a variable resistor 111. The contacts $c$ of the relays 105 to 108 are connected to the other end of the resistor 111; and the contact $c$ of the relay 109 is connected to the opposite corner 112 of the bridge.

The resistor 111 is adjusted until it has a value equal to the conductance of a cell containing normal milk from a specific herd. The resistor will not normally require further adjustment while the bridge is used with that herd unless a major change, for instance, in the herd's diet, takes place.

The reed relays are arranged round the periphery of a rotor 113 carrying magnets 115 and 116 (see FIGS. 11 and 12). A spiral spring 119 returns the rotor to the position shown in FIG. 11 when an arm 117, used to rotate the rotor, is released. In order to substitute the resistance 111 for one of the conductivity cells the rotor is rotated until the magnet 115 is opposite the relay connected in series with that conductivity cell. For example, when the magnet 115 is opposite the reed relay 107, the resistor 111 is connected, by way of the relay 109 and the contacts 107a and 107c, between the corner 110 and oscillator 117. At the same time the contacts 107a and 107b are open-circuit and the conductivity cell 102 is disconnected from the bridge. A similar action takes place when the magnet 115 is opposite the relays 105 or 106, but in these positions the relay 109 is operated so that the resistor 111 is connected between the contact 105c or 106c and the corner 112 of the bridge.

In each position of the magnet 115, opposite one of the relays 105 to 108, spring-loaded indexing balls 118 index the position of the rotor so that it is apparent to an operator that the rotor is in the correct position. The rotor will, nevertheless, return to its initial position when the arm 117 is released.

We claim:

1. Apparatus for use in comparing the conductivities of milk drawn during milking from the quarters of the udder of a cow, including a chamber divided into four conductivity cells, and having eight electrodes, two in each cell separated by insulating material, the electrodes and insulating material in each cell forming a curved surface in that cell which in the cross-section of greatest curvature forms a generally circular arc, the radius of which is longer than the arc, the chamber having four inlets, one in each cell, and a common outlet with access from all the cells, and the four inlets being positioned generally away from the common outlet to cause milk to flow over the electrodes in each cell before reaching the common outlet.

2. Apparatus according to claim 1 wherein the said radius is infinite.

3. Apparatus according to claim 1 wherein the said surfaces in the cells have the same curvature and together form a continuous surface of the same curvature extending separately into each cell and forming a generally circular wall for the chamber, and the cells are partially formed by barriers radial to the circular wall.

4. Apparatus according to claim 3 wherein the chamber has a generally hemispherical wall opposite the circular wall, the common outlet is at the center of the circular wall and the inlets are positioned in the hemispherical wall approximately opposite the common outlet.

5. Apparatus according to claim 1 wherein the electrodes comprise conducting rubber made by compounding rubber chosen from the group including natural rubber and synthetic rubber with material from the group including reinforcing black, finely divided graphite, and reinforcing black and finely divided graphite.

6. Apparatus according to claim 1 wherein the electrodes comprise conducting resin.

7. Apparatus according to claim 1 wherein the electrodes are connected in one of the bridge arms particular to that cell and switch means are provided allowing a resistor to be substituted successively in each of the four arms, the switch means including five groups of changeover contacts in each of which a common contact is normally in contact with a first contact but when changed over is in contact with a second contact, the common contacts of first and second of the groups being connected to one corner to the bridge, the common contacts of third and fourth of the groups being connected to the opposite corner of the bridge, each bridge arm including the first and common contacts of one of the said groups particular thereto, the second contacts of the four groups being connected to one end of the resistor, the first and second contacts of the fifth group being connected to the other opposite corners, respectively, of the bridge, and the other end of the resistor connected to the common contact of the fifth group.

8. Apparatus according to claim 7 wherein the groups of contacts are reed switches arranged around the periphery of a rotor carrying first and second magnets to operate the switches, the first magnets being arranged to successively change over the contacts of the first four groups, as the rotor is rotated, and the second magnet changing over the contacts of the fifth group when the contacts of the third and fourth groups are changed over.

* * * * *

UNITED STATES PATENT OFFICE
CERTIFICATE OF CORRECTION

Patent No. 3695230             Dated October 3, 1972

Inventor(s) JOSHUA CREER QUAYLE and GRAHAM ROLAND GREATRIX

It is certified that error appears in the above-identified patent and that said Letters Patent are hereby corrected as shown below:

Add to the heading:

---Assigned to National Research Development Corporation. ---

Signed and sealed this 6th day of March 1973.

(SEAL)
Attest:

EDWARD M. FLETCHER, JR.          ROBERT GOTTSCHALK
Attesting Officer                  Commissioner of Patents